United States Patent
Vallamkondu et al.

(10) Patent No.: US 12,298,199 B2
(45) Date of Patent: May 13, 2025

(54) SLIDING DISCRETE FOURIER TRANSFORM (DFT) BINS FOR FUEL QUANTITY MEASUREMENTS

(71) Applicant: Simmonds Precision Products, Inc., Vergennes, VT (US)

(72) Inventors: Aswin Kumar Vallamkondu, Banglore (IN); David H. Crowne, Weybridge, VT (US); Prashant Vadgaonkar, Bangalore (IN); Venkata Sai Sudheer Kumar, Bangalore (IN)

(73) Assignee: Simmonds Precision Products, Inc, Vergennes, VT (US)

( * ) Notice: Subject to any disclaimer, the term of this patent is extended or adjusted under 35 U.S.C. 154(b) by 366 days.

(21) Appl. No.: 17/990,876

(22) Filed: Nov. 21, 2022

(65) Prior Publication Data
US 2023/0160766 A1   May 25, 2023

(51) Int. Cl.
*G01L 9/00* (2006.01)
*B64D 37/04* (2006.01)
*G01F 23/14* (2006.01)

(52) U.S. Cl.
CPC ............ *G01L 9/0077* (2013.01); *B64D 37/04* (2013.01); *G01F 23/14* (2013.01)

(58) Field of Classification Search
CPC .................................................. G01L 9/0077
See application file for complete search history.

(56) References Cited

U.S. PATENT DOCUMENTS

| | | | |
|---|---|---|---|
| 5,642,445 A * | 6/1997 | Bucaro | G01H 3/12 367/24 |
| 6,924,898 B2 | 8/2005 | Deck | |
| 7,010,459 B2 | 3/2006 | Eryurek et al. | |
| 7,110,893 B2 * | 9/2006 | Loose | G01F 1/3259 702/45 |
| 8,290,721 B2 | 10/2012 | Wehrs et al. | |

(Continued)

FOREIGN PATENT DOCUMENTS

| CN | 101852638 B | 2/2012 |
|---|---|---|
| CN | 103208101 B | 10/2015 |

OTHER PUBLICATIONS

Extended European Search Report dated Apr. 12, 2023, issued during the prosecution of European Patent Application No. EP 22209322.1.

*Primary Examiner* — John Fitzgerald
(74) *Attorney, Agent, or Firm* — Kinney & Lange, P.A.

(57) ABSTRACT

A method includes receiving wavelength domain data for a time step, performing a Discrete Fourier Transform (DFT) to transform the wavelength domain data for the time step into frequency domain data for the time step only for the limited set of frequency bins associated with a frequency of interest, calculating pressure based on the frequency domain data for the time step, and updating the frequency of interest and the limited set of frequency bins. The method includes repeating receiving wavelength data for subsequent time steps, performing a DFT to transform the wavelength data for the respective subsequent time steps, calculating pressure for each subsequent time step, and updating the frequency of interest and limited set of frequency bins for each subsequent time step. The method includes outputting pressure data based on calculating pressure for the subsequent time steps.

16 Claims, 3 Drawing Sheets

(56) References Cited

U.S. PATENT DOCUMENTS

| | | | |
|---|---|---|---|
| 9,210,506 B1* | 12/2015 | Nawfal | H04R 3/04 |
| 9,766,178 B2 | 9/2017 | Pechstedt | |
| 10,324,226 B2* | 6/2019 | Widmer | G01V 8/10 |
| 10,368,804 B2 | 8/2019 | Ser et al. | |
| 10,488,255 B2* | 11/2019 | Gruca | G01J 3/0218 |
| 10,551,237 B2 | 2/2020 | Cipullo et al. | |
| 10,559,138 B2 | 2/2020 | Worden et al. | |
| 10,796,190 B2 | 10/2020 | Heshmat Dehkordi et al. | |
| 12,025,482 B2* | 7/2024 | Crowne | G01L 9/0079 |
| 2008/0144856 A1* | 6/2008 | Kenichi | G01R 23/167 |
| | | | 381/94.3 |
| 2011/0026620 A1* | 2/2011 | Liao | H04L 25/0224 |
| | | | 375/260 |
| 2014/0098371 A1* | 4/2014 | Sabry | G01J 3/0256 |
| | | | 356/451 |
| 2015/0020599 A1* | 1/2015 | Pechstedt | G01L 19/04 |
| | | | 73/705 |
| 2015/0033848 A1* | 2/2015 | Pechstedt | G01P 15/08 |
| | | | 73/497 |
| 2017/0122828 A1* | 5/2017 | Pechstedt | G01L 9/0079 |
| 2018/0164140 A1 | 6/2018 | Carralero et al. | |
| 2018/0321085 A1 | 11/2018 | Gruca et al. | |

* cited by examiner

SLIDING DISCRETE FOURIER TRANSFORM (DFT) BINS FOR FUEL QUANTITY MEASUREMENTS

CROSS REFERENCE TO RELATED APPLICATIONS

This application claims priority to Indian Patent application No. IN 202111054150, filed Nov. 24, 2021. The entire contents of this application are incorporated herein by reference in their entirety.

BACKGROUND

1. Field

The present disclosure relates to pressure and temperature measurements, and more particularly to optical Fabry-Perot based pressure and temperature sensing.

2. Description of Related Art

Pressure sensing can be performed using optical pressure sensors. These sensors function on the Fabry-Pérot interferometry. As pressure on the sensor varies, an optical cavity changes dimensions. There are various techniques that interpret the reflected data from the optical cavity to compute fuel pressure. One application, among others, is for fuel level sensing, fuel quantity gauging, and temperature sensing. Existing techniques such as wavelength tracking, peak-to-peak tracking, and Fourier Transform based algorithms have been used, each with its own set of advantages and disadvantages. Generally, there is a tradeoff between accuracy on the one hand and on the other hand computation time and memory depth.

The conventional techniques have been considered satisfactory for their intended purpose. However, there is an ever present need for improved systems and methods for producing fuel measurements with optical sensors. This disclosure provides a solution for this need.

SUMMARY

A method includes receiving wavelength domain data for a first time step from an optical pressure sensor, performing a Discrete Fourier Transform (DFT) to transform the wavelength domain data into frequency domain data, e.g. for the entire band, identifying a frequency of interest in the frequency domain data, and selecting a limited set of frequency bins in the frequency domain data based on the frequency of interest. The method includes receiving wavelength domain data for a second time step, performing a DFT to transform the wavelength domain data for the second time step into frequency domain data for the second time step only for the limited set of frequency bins, calculating pressure based on the frequency domain data for the second time step, updating the frequency of interest and the limited set of frequency bins, and repeating receiving wavelength data for subsequent time steps, performing a DFT to transform the wavelength data for the respective subsequent time steps, calculating pressure for each subsequent time step, and updating the frequency of interest and limited set of frequency bins for each subsequent time step. The method includes and outputting pressure data based on calculating pressure for the subsequent time steps.

Receiving wavelength domain data can include receiving a complete reflected spectrum. Identifying a frequency of interest can include calculating the frequency of interest (F) as: $F=M*Fs/N$, wherein M is bin number of a bin with the highest value, Fs is sampling frequency, and N is DFT bin size. Updating the frequency of interest can include calculating the frequency of interest (F) as: $F=M*Fs/N$, wherein M is bin number of a bin with the highest value, Fs is sampling frequency, and N is the total number of DFT bins/points, which can range from $+/-N/2$ bins/points.

Selecting a limited set of frequency bins can include limiting the set of frequency bins to bins in a range from $M-x$ to $M+x$, wherein x is an integer. Updating the limited set of frequency bins can include limiting the set of frequency bins to bins in a range from $M-x$ to $M+x$, wherein x is an integer. It is contemplated that x can be selected based on maximum change in a sensor generating the wavelength domain data.

Receiving wavelength domain data can include converting sensor output into an interference waveform to produce the wavelength domain data. The method can include using the pressure data to calculate fuel quantity in a fuel tank. The fuel tank can be aboard an aircraft and the method can include changing one or more flight parameters of the aircraft, e.g. speed, altitude, heading, trim, distribution of fuel across multiple fuel tanks, or the like, based on fuel quantity calculated.

A method includes receiving wavelength domain data for a time step, performing a DFT to transform the wavelength domain data for the time step into frequency domain data for the time step only for the limited set of frequency bins associated with a frequency of interest, calculating pressure based on the frequency domain data for the time step, and updating the frequency of interest and the limited set of frequency bins. The method includes repeating receiving wavelength data for subsequent time steps, performing a DFT to transform the wavelength data for the respective subsequent time steps, calculating pressure for each subsequent time step, and updating the frequency of interest and limited set of frequency bins for each subsequent time step. The method includes outputting pressure data based on calculating pressure for the subsequent time steps.

A system includes an optical pressure sensor. A processor is operatively connected to the optical pressure sensor to receive output from the sensor. The processor includes or is operatively connected to machine readable instructions configured to cause the processor to perform methods as described above.

The optical pressure sensor can includes an optical cavity mounted inside a fuel tank. The fuel tank can be aboard an aircraft. The processor can be operatively connected to a display in the aircraft for displaying fuel level and/or quantity information based on pressure data from the processor. The processor can be operatively connected to avionics of the aircraft for changing at least one flight parameter, e.g. speed, altitude, heading, trim, distribution of fuel across multiple fuel tanks, or the like, of the aircraft based on fuel level and/or quantity information from the processor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
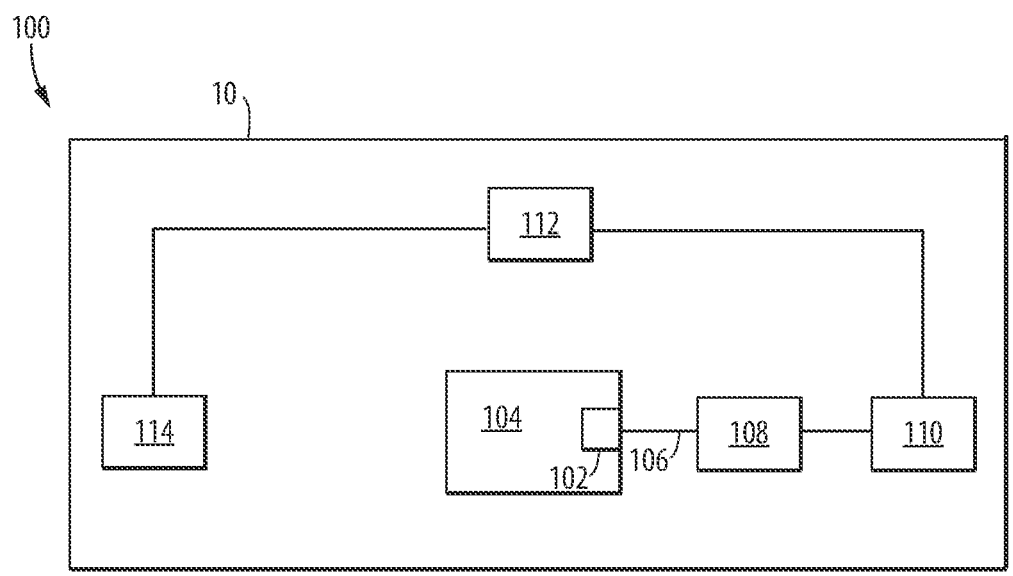
FIG. 1 is a schematic view of an embodiment of a system constructed in accordance with the present disclosure, showing the optical sensor pressure sensor in an aircraft fuel tank.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide fuel quantity measurements based on optical pressure sensor data with reduced computational expense relative to traditional techniques. More generally, while discussed herein in the exemplary context of fuel level and fuel quantity measurement, those skilled in the art will readily appreciate that systems and methods as disclosed herein can be applied to any suitable measurement application such as temperature and/or pressure measurement in a sapphire Fabry-Perot sensor for use in an air management system, high temperature measurement in a gas turbine engine, pressure and temperature measurement in a gas turbine engine, outside air temperature measurement on an aircraft, pressure measurement in a pitot-static sensor for airspeed indication, hydraulic pressure measurement in an aircraft landing gear, strain measurement in the load-transmitting members of a helicopter flight control system, and the like.

The system 100 includes an optical pressure sensor 102 mounted inside a fuel tank 104 of an aircraft 10 or other moving vehicle. An optic fiber 106 connects the optical pressure sensor to an optical processor 108 that generates sensor data output. A processor 110 is operatively connected to the optical pressure sensor 102 and the optical processor 108 to receive output from the sensor 102. The processor 110 includes or is operatively connected to machine readable instructions configured to cause the processor 110 to perform methods as described herein. The processor calculates fuel levels and/or quantities and outputs them to avionics 112 and/or a cockpit display 114 of the aircraft 10. The display 114 can display fuel level and/or fuel quantity information based on pressure data from the processor 110. The avionics 112 can change at least one flight parameter, e.g. speed, altitude, heading, trim, distribution of fuel across multiple fuel tanks, or the like, of the aircraft 10 based on fuel level and/or quantity information from the processor 110.

Figure 2:
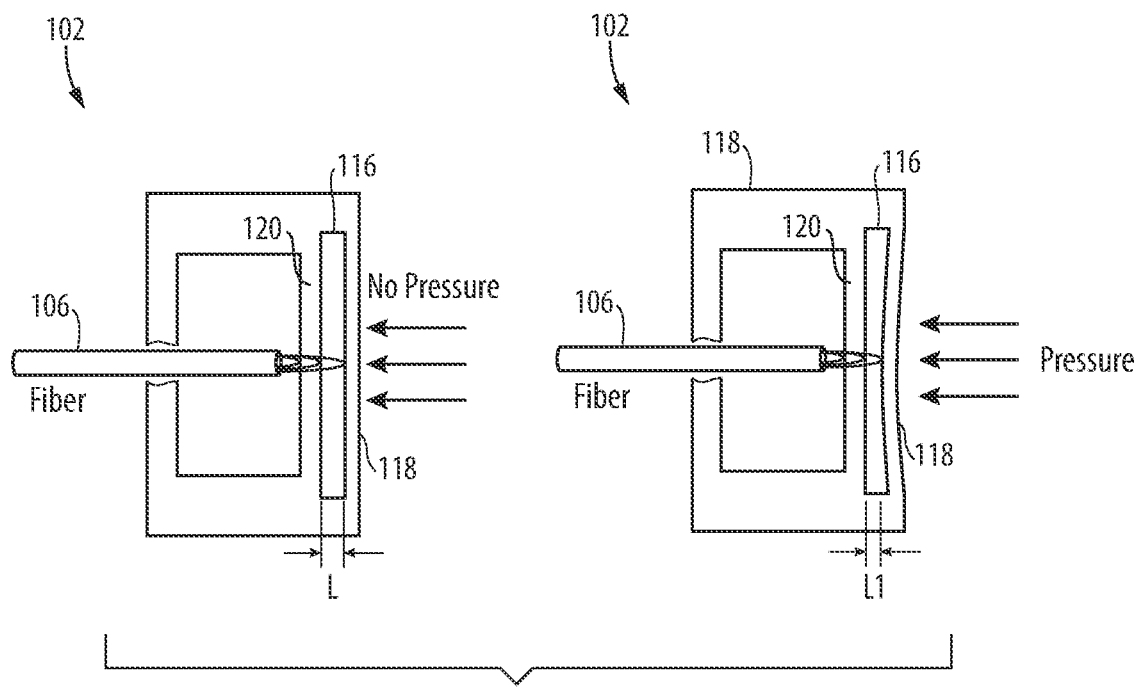
FIG. 2 is a schematic view of the optical pressure sensor of FIG. 1, showing the sensor in both a non-deflected state in the absence of pressure and in a deflected state in the presence of pressure.

With reference now to FIG. 2, the optical pressure sensor 102 includes an optical cavity 116. As shown on the left in FIG. 2, when there is no pressure acting on the diaphragm 118, there is a certain spacing L between the diaphragm and a primary reflector 120. As shown on the right in FIG. 2, when there is a pressure acting on the diaphragm 118, it deflects inward relative to the optical cavity 116, reducing the spacing between the diaphragm 118 and the primary reflector 120 to L1. A laser generated in the optical processor 108 of FIG. 1 is emitted from the end of the optic fiber 106 in FIG. 2. The reflections of the laser from the diaphragm 118 and primary reflector 120 are reflected back into the optic fiber 106 and can be detected by the optical processor 108 of FIG. 1. Variations in the spacing L/L1 change how the reflections of the diaphragm 118 and main reflector 120 interfere with one another, which can be interpreted into a pressure reading indicative of the pressure acting on the diaphragm 118. This type of sensor 102 can be useful in aircraft fuel tanks where it is desirable to keep electrical wiring to a minimum, since the sensor 102 itself has no electrical components and only requires the optic fiber 106 to pass into the interior of the fuel tank 104 to the optical processor 108 (shown in FIG. 1) where the electrical components are located.

Figure 3:
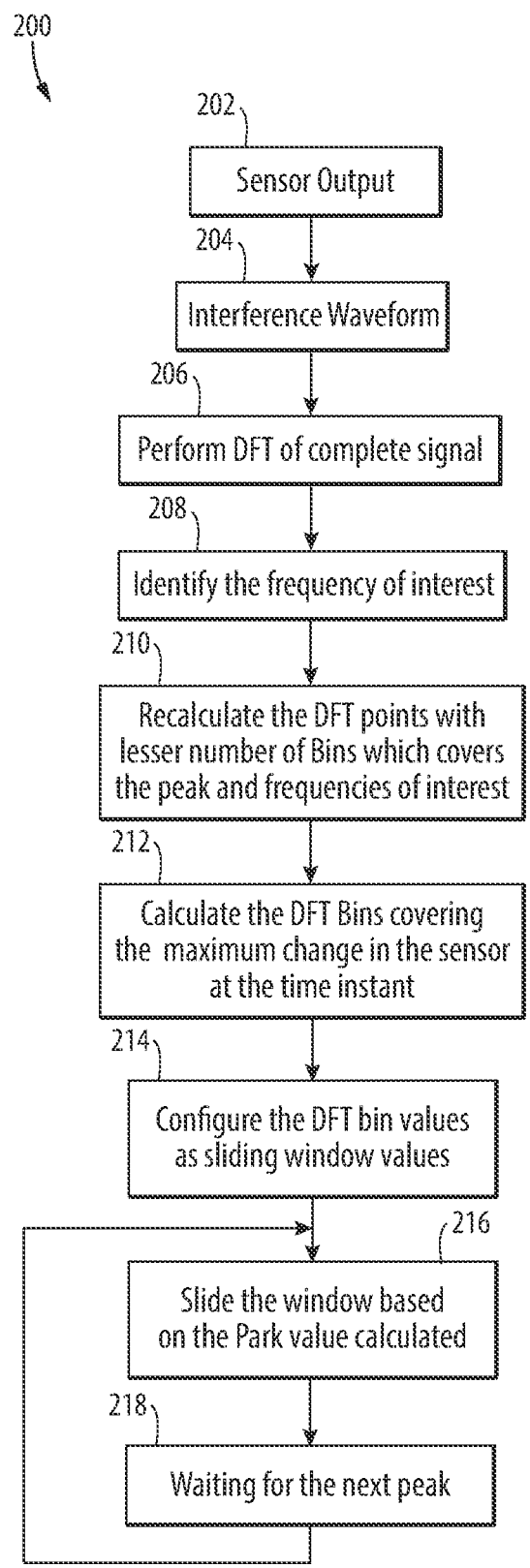
FIG. 3 is a process diagram for a method in accordance with the present disclosure, showing portions of the process for converting sensor data into pressure data.

With reference now to FIG. 3, method 200 includes taking sensor output as indicated by box 202, e.g. from sensor 102 and/or optical processor 108 of FIG. 1, and converting it into an interference waveform or wavelength domain data as indicated in FIG. 3 by box 204. The method 200 includes receiving the wavelength domain data, e.g. in the processor 110 of FIG. 1, for a first time step. Receiving wavelength domain data can includes converting sensor output into an interference waveform to produce the wavelength domain data either in the optical processor 108 or in the processor 110 of FIG. 1.

As indicated in FIG. 3 by box 206, the method 200 includes performing a Discrete Fourier Transform (DFT) to transform the wavelength domain data into frequency domain data. For the first time step, the DFT is performed for the complete spectrum signal of the wavelength domain data.

Figure 4:
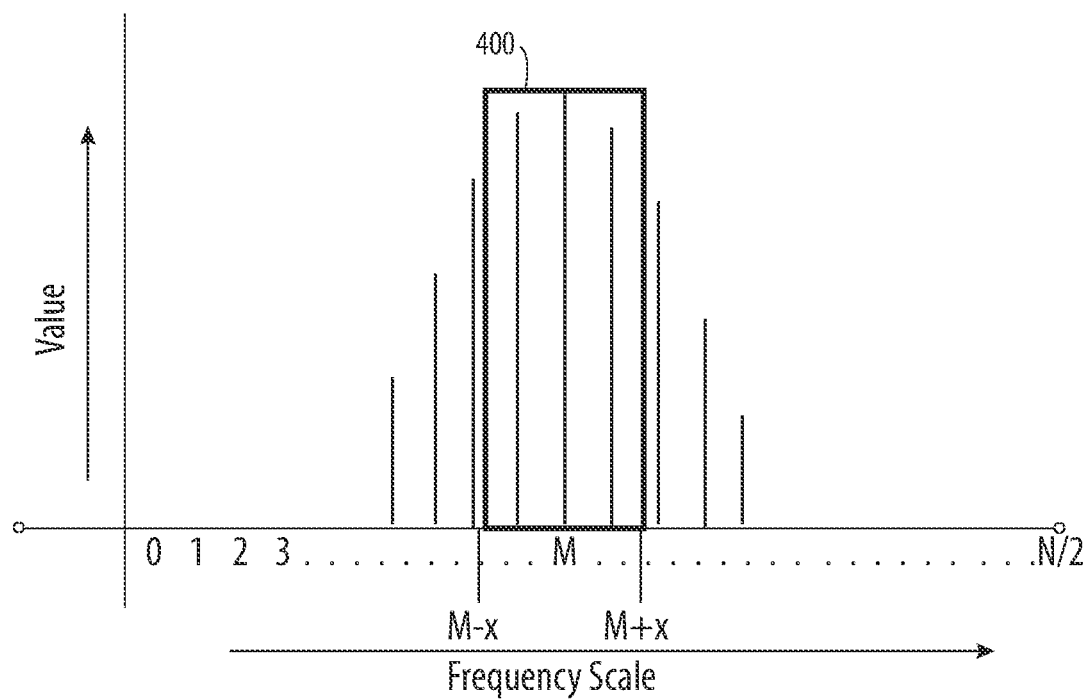
FIG. 4 is a graph showing frequency domain data with a sliding window for bins to be used for pressure calculations in accordance with the process of FIG. 3.

With continued reference to FIG. 3, as indicated by box 208, the method includes identifying a frequency of interest in the frequency domain data, and selecting a limited set of frequency bins in the frequency domain data based on the frequency of interest. Referring to FIG. 4, which represents some frequency domain data distributed in bins along the horizontal axis, identifying a frequency of interest includes calculating the frequency of interest (F) as:

$$F = M \cdot F_s / N,$$

wherein M is bin number of a bin with the highest value, Fs is sampling frequency, and N is the total number of DFT bins/points, which can range from +/−N/2 bins/points. Selecting a limited set of frequency bins includes limiting the set of frequency bins to bins in a range from M−x to M+x, wherein x is an integer. It is contemplated that x is selected based on maximum change in a sensor generating the wavelength domain data, which is a property of the measured physical parameter (pressure, temperature etc.). This physical parameter should be a slow varying parameter with respect to time, where the technique disclosed herein can be applied. In FIG. 4, the window 400, which is a sliding window as discussed below, includes the limited set of frequency bins.

As shown in FIG. 3 by box 210, the method 200 includes recalculating the DFT points with the limited set of frequency bins. Box 212 indicates calculating the DFT bins covering maximum change in the sensor at the time step of the sensor output (box 202). As indicated in FIG. 3 with box 214, the method includes configuring the resulting DFT bin values as sliding window values, sliding the window for the next time step based on the peak value calculated in the previous time step, as indicated in box 216, and repeating the process for sensor data for each subsequent time step as indicated in box 218, where the DFT in the subsequent time steps only has to be calculated or performed for the limited sliding window of bins. Finding the frequency of interest and the window can be done using the same formulae as in the first time step. The DFT need not be performed on the full spectrum for the subsequent time steps.

The method includes using the pressure data to calculate fuel quantity in a fuel tank, e.g. fuel tank 104 of FIG. 1. The avionics 112 or pilot can use the fuel quantity information to change one or more flight parameters of the aircraft as described above with reference to FIG. 1. The peak frequency and its amplitude will be proportional to the spacing L/L1 (cavity length as discussed above with reference to FIG. 2). The cavity length is proportional to the pressure being sensed, which can be calculated for each time step once the peak frequency is identified for that time step.

Potential benefits of systems and methods as disclosed herein include accuracy akin to exhaustive calculation techniques with a small fraction of the computational expense, e.g. two or three orders of magnitude fewer calculations needed per time step. This accuracy and reduction in computational complexity leads to a decrease in execution time to achieve a highly accurate reading, potentially enabling applications where quick acquisition times are advantageous.

Methods and systems of the present disclosure, as described above and shown in the drawings, provide for fuel quantity measurements based on optical pressure sensor data with reduced computational expense relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A method comprising:
  providing a processor that includes or is operatively connected to machine readable instructions configured to cause the processor to perform the steps of:
  receiving wavelength domain data for a first time step from an optical pressure sensor;
  performing a Discrete Fourier Transform (DFT) to transform the wavelength domain data into frequency domain data for the entire band of the wavelength domain data;
  identifying a frequency of interest in the frequency domain data;
  selecting a limited set of frequency bins in the frequency domain data based on the frequency of interest;
  receiving wavelength domain data for a second time step;
  performing a DFT to transform the wavelength domain data for the second time step into frequency domain data for the second time step only for the limited set of frequency bins;
  calculating pressure based on the frequency domain data for the second time step;
  updating the frequency of interest and the limited set of frequency bins;
  repeating receiving wavelength data for subsequent time steps, performing a DFT to transform the wavelength data for the respective subsequent time steps, calculating pressure for each subsequent time step, and updating the frequency of interest and limited set of frequency bins for each subsequent time step; and
  and outputting pressure data based on calculating pressure for the subsequent time steps.

2. The method as recited in claim 1, wherein receiving wavelength domain data includes receiving a complete reflected spectrum.

3. The method as recited in claim 1, wherein identifying a frequency of interest includes calculating the frequency of interest (F) as:

$$F = M * Fs/N,$$

wherein M is bin number of a bin with the highest value, Fs is sampling frequency, and N is the total number of DFT bins/points, which can range from +/−N/2 bins/points.

4. The method as recited in claim 1, wherein updating the frequency of interest includes calculating the frequency of interest (F) as:

$$F = M * Fs/N,$$

wherein M is bin number of a bin with the highest value, Fs is sampling frequency, and N is DFT bin size.

5. The method as recited in claim 1, wherein receiving wavelength domain data includes converting sensor output into an interference waveform to produce the wavelength domain data.

6. The method as recited in claim 1, further comprising using the pressure data to calculate fuel quantity in a fuel tank.

7. The method as recited in claim 6, wherein the fuel tank is aboard an aircraft and further comprising changing one or more flight parameters of the aircraft based on fuel quantity calculated.

8. The method as recited in claim 1, wherein selecting a limited set of frequency bins includes limiting the set of frequency bins to bins in a range from M−x to M+x, wherein x is an integer.

9. The method as recited in claim 8, wherein updating the limited set of frequency bins includes limiting the set of frequency bins to bins in a range from M−x to M+x, wherein x is an integer.

10. The method as recited in claim 9, wherein x is selected based on maximum change in a sensor generating the wavelength domain data.

11. A method comprising:
  providing a processor operatively connected to an optical pressure sensor to receive output from the sensor, wherein the processor includes or is operatively connected to machine readable instructions configured to cause the processor to perform the steps of:
  receiving wavelength domain data for a time step;
  performing a DFT to transform the wavelength domain data for the time step into frequency domain data for the time step only for the limited set of frequency bins associated with a frequency of interest;
  calculating pressure based on the frequency domain data for the time step;
  updating the frequency of interest and the limited set of frequency bins;
  repeating receiving wavelength data for subsequent time steps, performing a DFT to transform the wavelength data for the respective subsequent time steps, calculating pressure for each subsequent time step, and updating the frequency of interest and limited set of frequency bins for each subsequent time step; and outputting pressure data based on calculating pressure for the subsequent time steps.

12. A system comprising:

an optical pressure sensor;

a processor operatively connected to the optical pressure sensor to receive output from the sensor, wherein the processor includes or is operatively connected to machine readable instructions configured to cause the processor to:

performing a DFT to transform wavelength domain data for the time step into frequency domain data for the time step only for the limited set of frequency bins associated with a frequency of interest;

calculate pressure based on the frequency domain data for the time step;

update the frequency of interest and the limited set of frequency bins;

repeat receiving wavelength data for subsequent time steps, performing a DFT to transform the wavelength data for the respective subsequent time steps, calculating pressure for each subsequent time step, and updating the frequency of interest and limited set of frequency bins for each subsequent time step; and output pressure data based on calculating pressure for the subsequent time steps.

13. The system as recited in claim 12, wherein the optical pressure sensor includes an optical cavity mounted inside a fuel tank.

14. The system as recited in claim 13, wherein the fuel tank is aboard an aircraft.

15. The system as recited in claim 14, wherein the processor is operatively connected to a display in the aircraft for displaying fuel level and/or fuel quantity information based on pressure data from the processor.

16. The system as recited in claim 14, wherein the processor is operatively connected to avionics of the aircraft for changing at least one flight parameter of the aircraft based on fuel level and/or quantity information from the processor.

* * * * *